Oct. 19, 1943.    J. B. WHITTED    2,332,123
ELECTRIC WINDSHIELD WIPER
Filed March 11, 1940    6 Sheets-Sheet 1

Inventor
John B. Whitted
By Williams, Bradbury,
& Hinkle
Attys.

Oct. 19, 1943. J. B. WHITTED 2,332,123
ELECTRIC WINDSHIELD WIPER
Filed March 11, 1940 6 Sheets-Sheet 4

Inventor.
John B. Whitted
By Williams, Bradbury,
& Hinkle.
Attys

Patented Oct. 19, 1943

2,332,123

UNITED STATES PATENT OFFICE 2,332,123

ELECTRIC WINDSHIELD WIPER

John B. Whitted, Glencoe, Ill., assignor to Stewart-Warner Corporation, Chicago, Ill., a corporation of Virginia Application March 11, 1940, Serial No. 323,487

17 Claims. (Cl. 15—255)

My invention relates to electric wind shield wipers and more particularly to electric wind shield wipers of the kind commonly used on automobiles.

Difficulty has been experienced with electric wind shield wipers in designing a wiper which when stopped will insure a location of the blades in such position that they will not obstruct the view of occupants of the automobile. Various attempts have been made to overcome this difficulty but none of the attempts heretofore made have proved to be entirely satisfactory.

An object of my invention is to provide an electric wind shield wiper which will stop with the blades located in a position where they are out of the line of vision of occupants of the automobile.

Another object of my invention is to provide an improved clutch mechanism.

Another object of my invention is to provide an electric wind shield wiper which is simple and inexpensive to manufacture, reliable in use and wherein the several parts are compactly arranged for positioning beneath the wind shield of an automobile.

Other objects and advantages will become apparent as the description proceeds.

Figures 1, 9, 10, 11:
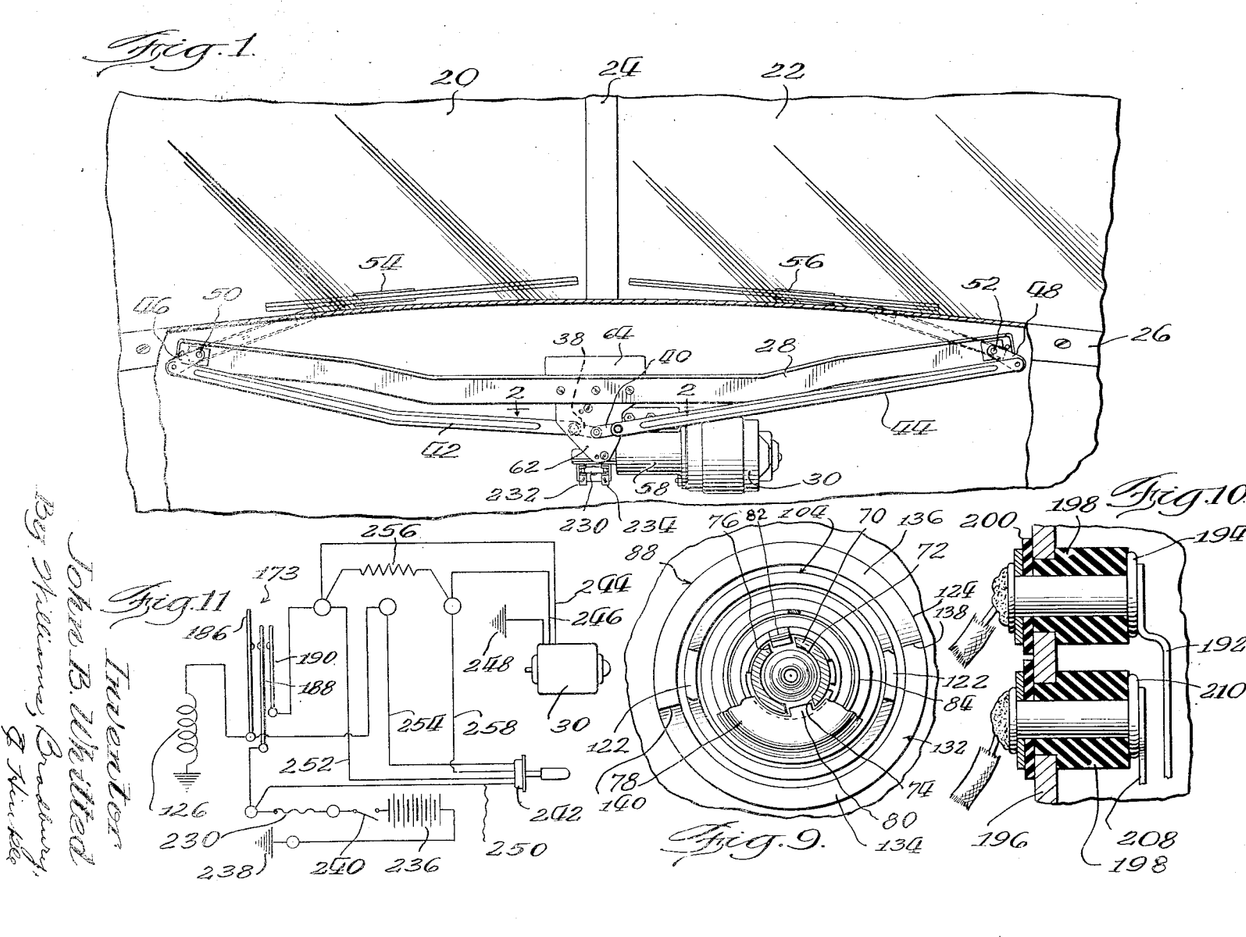
Fig. 1 is a diagrammatic view showing my invention applied to the wind shield of an automobile.
Fig. 9 is an irregular transverse section taken on the line 9—9 of Fig. 4.
Fig. 10 is a detail of the switch mechanism and is taken on the line 10—10 of Fig. 5.
Fig. 11 is a wiring diagram.

Referring particularly to Figure 1, I have illustrated my invention as being applied to an automobile having a divided wind shield comprising glass panels 20 and 22, a centrally located metal strip 24 and a base 26. My electric wind shield wiper is preferably mounted as a unit on a bar 28 which is attached at its ends to the wind shield frame 26 preferably at the points where the operating shafts for the wiper blades penetrate the wind shield frame.

My electric wind shield wiper comprises in general an electric motor 30 driving a worm 32 (Fig. 4) meshing with a worm wheel 34 on a shaft 36 having cranks 38 and 40 for reciprocating bars 42 and 44 connected respectively to arms 46 and 48 attached to shafts 50 and 52 which extend through the base of the wind shield and drive the wiper blades 54 and 56 respectively. In Figure 1 the wiper blades 54 and 56 are shown in the parked position which they assume when the wind shield wiper is stopped.

Figures 2, 3:
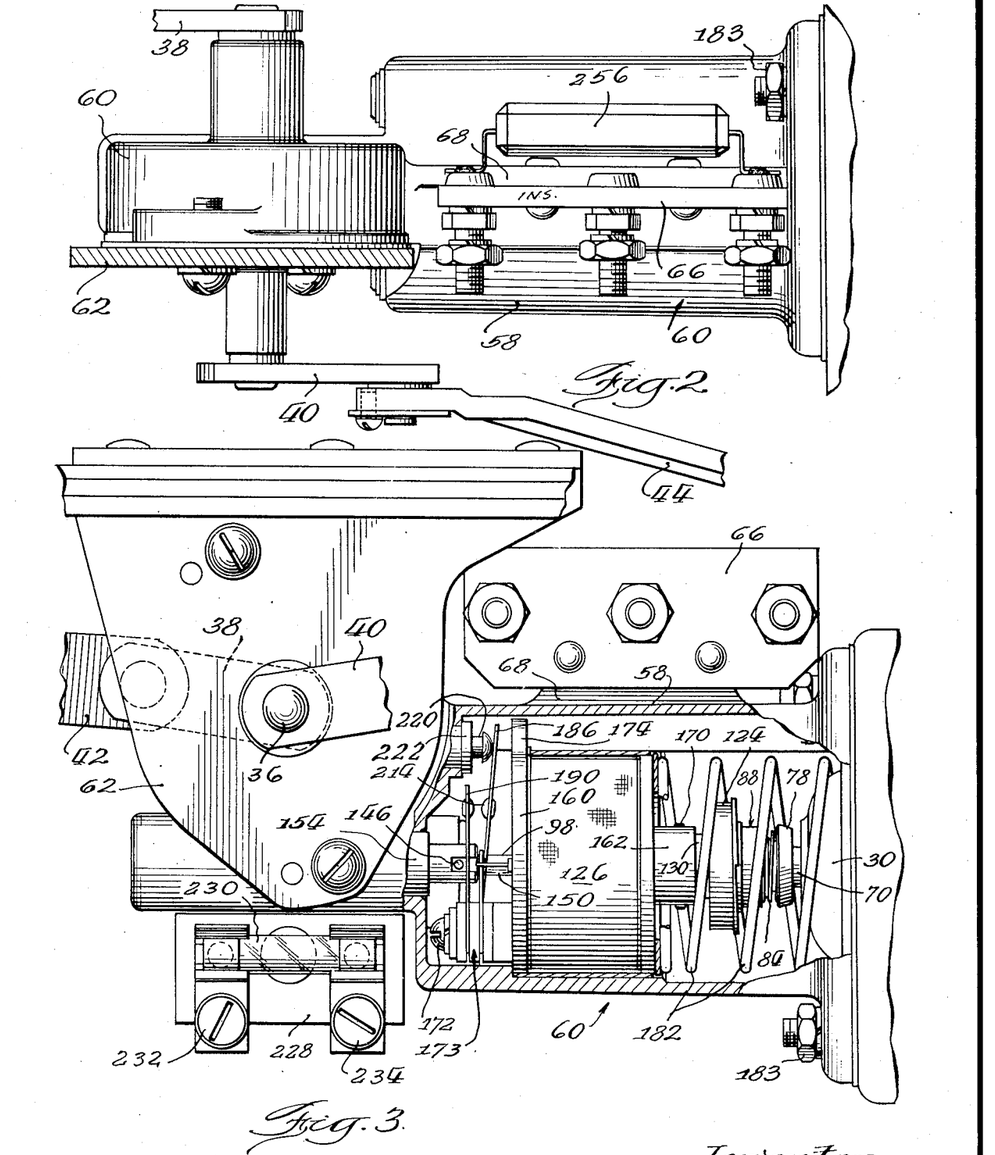
Fig. 2 is a plan view of the driving mechanism taken on the line 2—2 of Fig. 1.
Fig. 3 is a view similar to Fig. 2 but taken at right angles thereto and showing parts cut away to disclose the interior mechanism of the driving connection.

The motor 30 is attached to one end of a tubular extension 58 of a housing 60 (Fig. 2) enclosing the driving mechanism. A plate 62 closes an opening in one side of this housing and serves as a means for supporting the motor and driving mechanism from the bar 28. A rubber block 64 or other suitable vibration-dampening means is preferably interposed between the plate 62 and the bar 28. A terminal block 66 of any suitable insulating material is preferably bolted or otherwise secured to an upstanding flange 68 integral with the tubular portion 58 of the housing 60.

Figure 4:
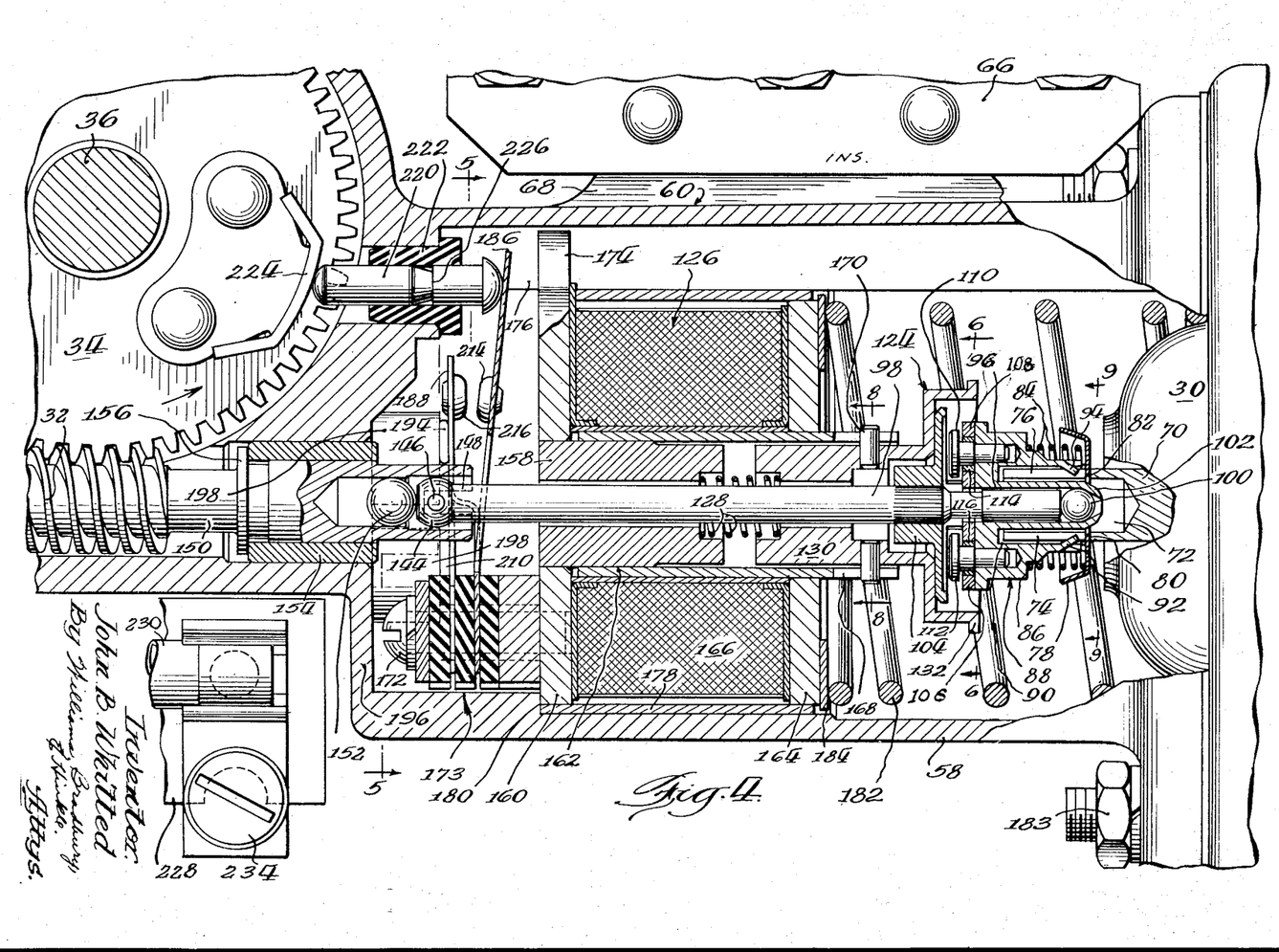
Fig. 4 is a generally vertical section taken on the line 4—4 of Fig. 5.

Referring particularly to Figure 4, I have illustrated the armature shaft 70 of the motor 30 as being provided with a recess 72 and axially extending slots 74 and 76. A metal cup 78 is slidably mounted on the armature shaft 70 and has inwardly directed fingers 80 and 82 engaging the slots 74 and 76 respectively, thereby determining the position of the cup axially of the shaft 70 under the thrust of a spiral spring 84.

The other end of the spring 84 abuts against a shoulder 86 provided by a tubular clutch member 88 axially movable relative to the armature shaft 70 and having a recess 90 for receiving one end of this shaft. The clutch member 88 has fingers 92 and 94 engaging the slots 74 and 76 respectively, to prevent relative rotation between the clutch member 88 and armature shaft 70.

The clutch member 88 has a central opening 96 rotatably receiving one end of a shaft 98 having an end abutting a ball 100 which is press-fitted into the tapered wall 102 of the clutch member. The extent to which the ball 100 is forced into the tapered wall 102 determines the extent to which the clutch member 88 telescopes the end of the shaft 98 and thereby determines the axial relationship between the clutch member 88 and a complementary clutch member 104 mounted on and rotatable with the shaft 98.

Before describing the clutch mechanism and its mode of operation, I first wish to point out that the structure just described is provided as a simple and inexpensive means for compensating for variations in length of the motor armature shaft 70 as manufactured and sold commercially. If the armature shafts of commercial motors were all of identically the same length, the clutch member 88 could be affixed directly to the armature shaft. I have found, however, that as a practical matter it is impossible to obtain inexpensive electric motors in which the armature shafts are of uniform length and the arrangement which I have just described for accurately positioning the clutch member 88 relative to the complementary clutch member 104 has proved to be extremely effective in actual use.

Figures 6, 7, 8:
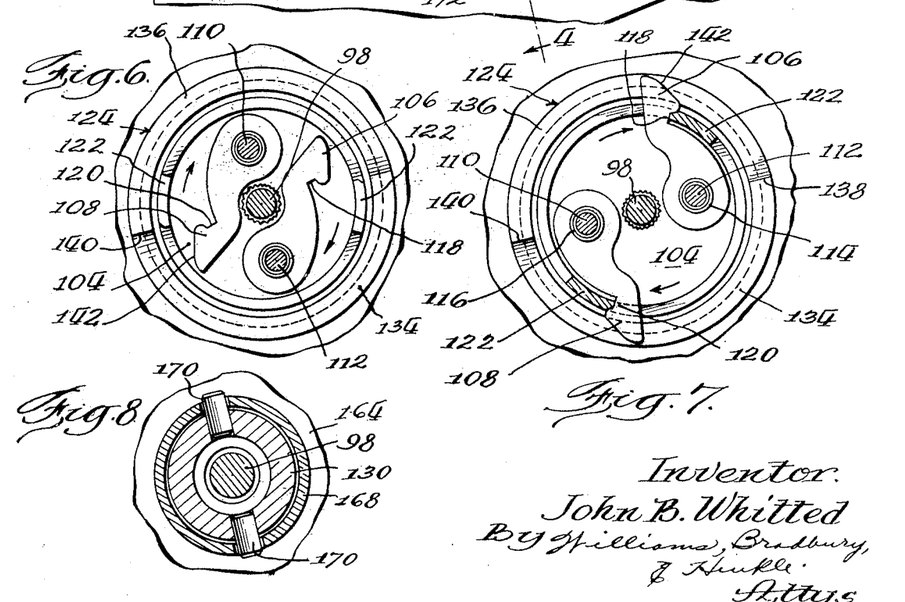
Fig. 6 is a section through the clutch mechanism and is taken on the line 6—6 of Fig. 4.
Fig. 7 is a view similar to Fig. 6 but showing the dogs in driving position.
Fig. 8 is a transverse section taken on the line 8—8 of Fig. 4.

Engagement between the clutch members 88 and 104 is effected by means of dogs 106 and 108 as best shown in Figures 6 and 7. These dogs are mounted upon pins 110 and 112 respectively and the dogs are preferably provided with bushings 114 and 116 to reduce friction and wear. I have found that by using these bushings there is no need for lubricating the pivotal mountings for the dogs 106 and 108 and I thereby avoid the gumminess and sticking commonly occurring where a lubricant is necessary.

The outer ends of the dogs 106 and 108 are provided with notches 118 and 120 and when the motor armature and clutch member 88 are rotated, the free ends of the dogs are thrown outwardly by centrifugal force for engagement with the axially extending projections 122 on the clutch member 104 as illustrated in Figure 7. It is to be understood that while I have shown my clutch as being provided with two dogs, that under some circumstances I prefer to use only a single dog and that the use of more than one dog is entirely optional, as one dog is sufficient for ordinary purposes.

Engagement and disengagement of the clutch is regulated by the cup 124 axially slidable under the control of a solenoid 126. In Figure 4 the cup 124 is shown in a position surrounding the dogs 106 and 108 and preventing the free ends of these dogs from flying outwardly so that the notches 118 and 120 can engage the projections 122 on the complementary clutch member. In order to permit the clutch to become engaged, the solenoid 126 is energized to move the cup 124 to the left, as viewed in Figure 4, so that the right-hand end of this cup is retracted to the left of the vertical plane of the dogs 106 and 108.

The notched ends of the dogs are then free to fly outwardly under the action of centrifugal force so that the notches 118 and 120 can engage the projections 122 on the clutch member 104 and thus establish a driving relation between the motor 30 and the shaft 98.

When the clutch is to be disengaged, the solenoid 126 is deenergized, thereby permitting the spring 128 to move the cup 124 and its hub 130 to the right, as viewed in Figure 4. The cup 124 has a face 132 which engages the free ends of the dogs. This face is wide enough to prevent the dogs from extending beyond the outer edge of this face and becoming caught on the edge thereof. This face 132 has two inclined or cam-like surfaces 134 and 136 extending between shoulders 138 and 140.

Referring particularly to Figure 7, it will be seen that the inclined surface 136 extends from the top of the shoulder 140 to the bottom of the shoulder 138. In this view the dog 106 is travelling in a clockwise direction along this inclined surface and when it strikes the shoulder 138, the free end of the dog will be moved inwardly to disengage the notch 118 from the projection 122. The outer end 142 of this dog is inclined so that thereafter the projection 122 engages this outer end 142 and moves the free end of the dog further inwardly to the position assumed in Figure 6. Simultaneously with this operation, the other dog 108 is similarly acted upon by the shoulder 140 and other projection 122 so that both dogs disengage the projections 122 at the same time. Thereafter the dogs remain in their retracted positions as shown in Figure 6 until the control cup 124 is again withdrawn to permit engagement of the dogs with the projections 122.

As viewed in Figure 4, the left-hand end of the shaft 98 is enlarged and generally ball-like, as indicated at 144, and is transversely bored to receive a driving pin 146 engaging slots 148 in the socket-like end of worm shaft 150. The axial position of the shaft 98 is accurately determined by a steel ball 152 which is accurately pressed to the desired position within the socket-like end of the shaft 150.

The worm shaft 150 is journaled in a bushing 154 carried in the housing 60. This shaft is provided with a flange 156 which engages one end of the bushing 154 and transmits thereto the axial thrust exerted by the worm 32.

My invention provides a novel arrangement of the solenoid 126 and automatic switch mechanism. This arrangement is extremely simple and compact and permits the several parts to be put together in sub-assemblies which can be easily inserted in initial manufacture and, if desired, easily removed for repair or replacement thereafter. My novel arrangement also provides for variation in commercial tolerances of the individual parts so that these variations do not interfere with the assembly operation or with the resultant operation of the completed device.

Referring particularly to Figure 4, it will be seen that the solenoid 126 comprises a unitary structure consisting of core 158, base plate 160, inner sleeve 162, upper plate 164, and coil 166. The core 158 provides a seat for the spring 128 and the sleeve 162 is illustrated as slotted at 168 for slidably receiving the pins 170 fixed in the hub 130 of the clutch control cup 124 whereby the clutch control cup is held against rotation. Both the magnet core 158 and the hub 130 are axially bored to receive the shaft 98 which is in spaced relation to the core and hub.

The screws 172 attached to base plate 160 of the solenoid carry automatic switch mechanism which I shall presently describe and which is indicated generally by the reference numeral 173. This switch mechanism must be maintained in the proper circumferential position about the axis of the shaft 98 and for this purpose I provide the base plate 160 with a tongue 174 which is received in a groove 176 in the interior of the cylindrical housing 58.

The solenoid 126 and switch mechanism carried thereby can be assembled as a unit prior to insertion in the cylindrical housing 58. The split sleeve 178 which forms a field piece for the solenoid may form either a part of this sub-assembly or may be inserted in the cylindrical housing 58 prior to the insertion of the solenoid. When the solenoid is inserted in the housing, the base plate 160 rests against a suitable shoulder 180 which determines the axial position of the solenoid in the housing. A spring 182 interposed between the solenoid and the motor 30 serves to hold the solenoid against the shoulder 180. The motor 30 is firmly attached to the end of the housing 58 by nuts and bolts 183 or other suitable attaching means.

A washer 184 is shown as interposed between the spring 182 and the solenoid proper. It will be noted that this plate overlies the right-hand end of the split sleeve 178 and also that the split sleeve 178 is made appreciably shorter than the solenoid so that slight variations in the length of the sleeve 178 will not prevent the spring 182 from holding the solenoid firmly against the shoulder 180. It will, of course, be appreciated that the washer 184 can be eliminated if desired, in which event the spring 182 would be designed to overlie the right-hand end of the split sleeve 178 to retain it in place.

Figure 5:
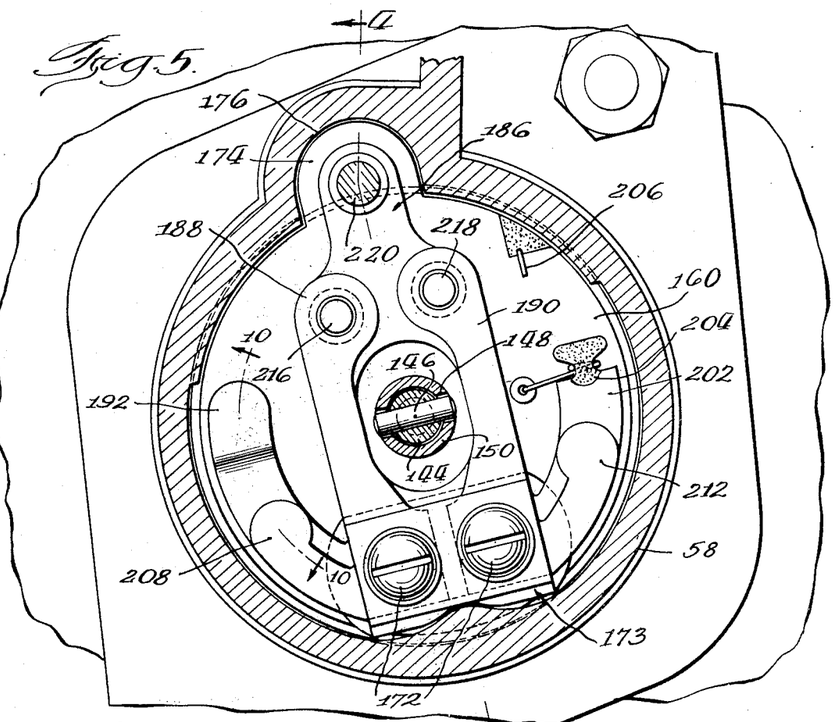
Fig. 5 is an irregular transverse section taken on the line 5—5 of Fig. 4.

The switch mechanism attached to the solenoid by screws 172 comprises a long switch plate 186 and a pair of shorter switch plates 188 and 190, all of which are suitably insulated from each other and from the base plate 160 and screws 172 in the manner indicated in Figures 4 and 5. The long switch plate 186 carries a spring finger 192 for engaging an electrical terminal 194 secured in the wall 196 forming the left-hand extremity of the cylindrical housing 58, the terminal being suitably insulated from such wall by bushing 198 and washer 200. The long switch plate 186 has a second arm 202 extending oppositely from the arm ending in the finger 192, the arm 202 terminating in a restricted neck 204 connected to one end of the coil 166 of the solenoid 126. The other end of this solenoid coil is grounded to the plate 160 as indicated at 206 (Fig. 5).

The switch plate 188 has a spring finger 208 engaging a second terminal 210 also carried in the wall 196 of the housing and suitably insulated therefrom. The switch plate 190 also has a spring finger 212 engaging a third terminal mounted in and insulated from the wall 196.

The long switch plate 186 has a pair of terminals 214 adapted to engage the terminals 216 and 218 at the upper ends of the switch plates 188 and 190 respectively. The long switch plate 186 is resilient and is biased in such a manner as to urge the contacts 214 into engagement with the contacts 216 and 218. These contacts are broken when the upper end of the long switch plate 186 is moved to the right by a pin 220 as illustrated in Figure 4.

The pin 220 reciprocates in a bushing 222 mounted in a wall of the housing 60 and the left-hand end of this pin is adapted to be engaged by a cam 224 on the worm wheel 34 so that upon each rotation of the worm wheel 34 the pin 220 is moved to break engagement between the contacts 214, 216 and 218. The pin 220 fits snugly in the bushing 222 and is provided with a shoulder 226 which functions to prevent loss of lubricant from that part of the housing containing the worm wheel and worm.

An important feature of my switch mechanism lies in the fact that no soldered or other manipulative connections need be made between the switch mechanism mounted on the base plate of the solenoid 126 and the conductors connecting this switch mechanism with other electrical elements. As the solenoid and switch mechanism carried thereby are inserted into the tubular housing 58, the spring fingers 192, 208 and 212 of the three switch plates, engage their respective terminals as indicated in Figure 10, slightly before the base plate 160 engages the shoulder 180. Further inward movement of the solenoid and switch members merely presses these spring fingers more firmly against their terminals and this firm engagement is maintained in the completely assembled mechanism.

For convenience, I have illustrated the housing 60 as providing a plate 228 affording a convenient location for mounting a replaceable fuse 230 and its associated terminals 232 and 234. The manner in which the fuse, switch plates, and other parts are connected in the electrical circuits is best shown in the electrical diagram of Figure 11.

Referring to Figure 11, I have indicated by reference numeral 236 the usual automobile battery grounded in the conventional manner at 238. The usual ignition switch is indicated at 240. The fuse 230 is illustrated as being interposed between the battery 236 and the automatic switch mechanism 173 and also between the battery 236 and the manual switch 242 for turning the wind shield wiper on and off and also for selectively operating this wiper at either high or low speed. The electric motor 30 is illustrated as having an armature circuit 244 and a field circuit 246, both of which are indicated as grounded at 248. While I have illustrated my wind shield wiper as connected to the battery 236 through the ignition switch 240, it will be understood that this arrangement is optional and, if desired, the wind shield wiper may be directly connected to the battery and thus entirely independent of the ignition switch.

When the wind shield wiper is not operating, the automatic switch mechanism 173 is held in the disconnected condition as illustrated in Figure 4 and as indicated in Figure 11. In this latter figure, the two short switch plates are indicated as being one behind the other, instead of being side by side, as in the actual device. When it is desired to operate the wind shield wiper at high speed, the switch 242 is manually moved to high speed position, thereby connecting conductor 250 with conductors 252 and 254. Conductor 252 connects with armature circuit 244 and with field circuit 246 through resistance 256, thereby connecting the motor for high speed operation. At the same time the motor is thus started, an electrical circuit is created through solenoid 126 by way of conductor 254, thereby causing this solenoid to draw clutch control cup 124 to the left, as viewed in Figure 4.

Rotation of motor armature 70 rotates clutch member 88 and dogs 106 and 108, causing the latter to fly outwardly and engage projections 122 on complementary clutch member 104, thereby creating a driving connection between the motor 30 and shaft 98. Rotation of shaft 98 rotates the worm 32 which in turn drives the worm wheel 34, cranks 38 and 40, links 42 and 44, arms 46 and 48, shafts 50 and 52, and wiper blades 54 and 56.

Rotation of worm wheel 34 removes cam 224 from engagement with pin 220 and permits the long spring plate 186 to engage the contacts on spring plates 188 and 190, thereby establishing circuits to the motor 30 and solenoid 126 in parallel with those established through the manual switch 242. Each time the worm wheel 34 rotates, cam 224 operates pin 220 to break the contacts between the long switch plate 186 and switch plates 188 and 190, but this has no effect on the operation of the device as long as the circuits through the manual switch 242 remain unbroken.

If it is desired to reduce the speed of operation of the wind shield wiper, the manual switch 242 is shifted to low speed position. The sole effect of this movement of the switch 242 is to connect conductor 258 with battery lead 250 and thus cut out the resistance 256 in the motor field circuit, thereby reducing the motor speed.

When it is desired to stop the wind shield wiper from either high speed or low speed operation, the manual switch 242 is moved to the "stop" position, thereby breaking the connection between battery lead 250 and conductors 252, 254, and 258. This has no effect on the operation of the wind shield wiper until cam 224 moves pin 220 to break the parallel circuits through the automatic switch 173. Breaking these connections through the automatic switch, disconnects the motor and solenoid from the battery and also from each other so that any regenerative current created in the motor will not delay release of the solenoid.

As soon as the circuit through the solenoid 126 is thus broken, this solenoid releases clutch control cup 124, which is thereupon moved to the right by spring 128 and disengages dogs 106 and 108 from projections 122, thereby disconnecting shaft 98 from the motor armature 70. Shaft 98, worm 32, worm wheel 34, and the linkage connecting this worm wheel with the wiper blades thereupon stop substantially instantaneously, whereas the motor may continue to rotate for an appreciable period. My novel mechanism thus makes it possible to stop the wiper blades 54 and 56 in parked position by proper locating the cam 224 on the worm wheel 34.

The particular linkage which I have utilized to connect the wiper blades with the worm wheel is not suitable for operating the wiper blades through arcs as great as 180°. It is therefore usual to arrange such blades so that they traverse arcs not materially greater than 90°. In Figure 1 I have illustrated the wiper blades as having a substantially horizontal parked position in which the outer ends of the blades are closely adjacent the metal strip 24 at the center of the wind shield. In their other extreme position, the wiper blades 54 and 56 would be nearly vertical and adjacent the outer edges of the glass panels 20 and 22 respectively.

Figures 12, 13:
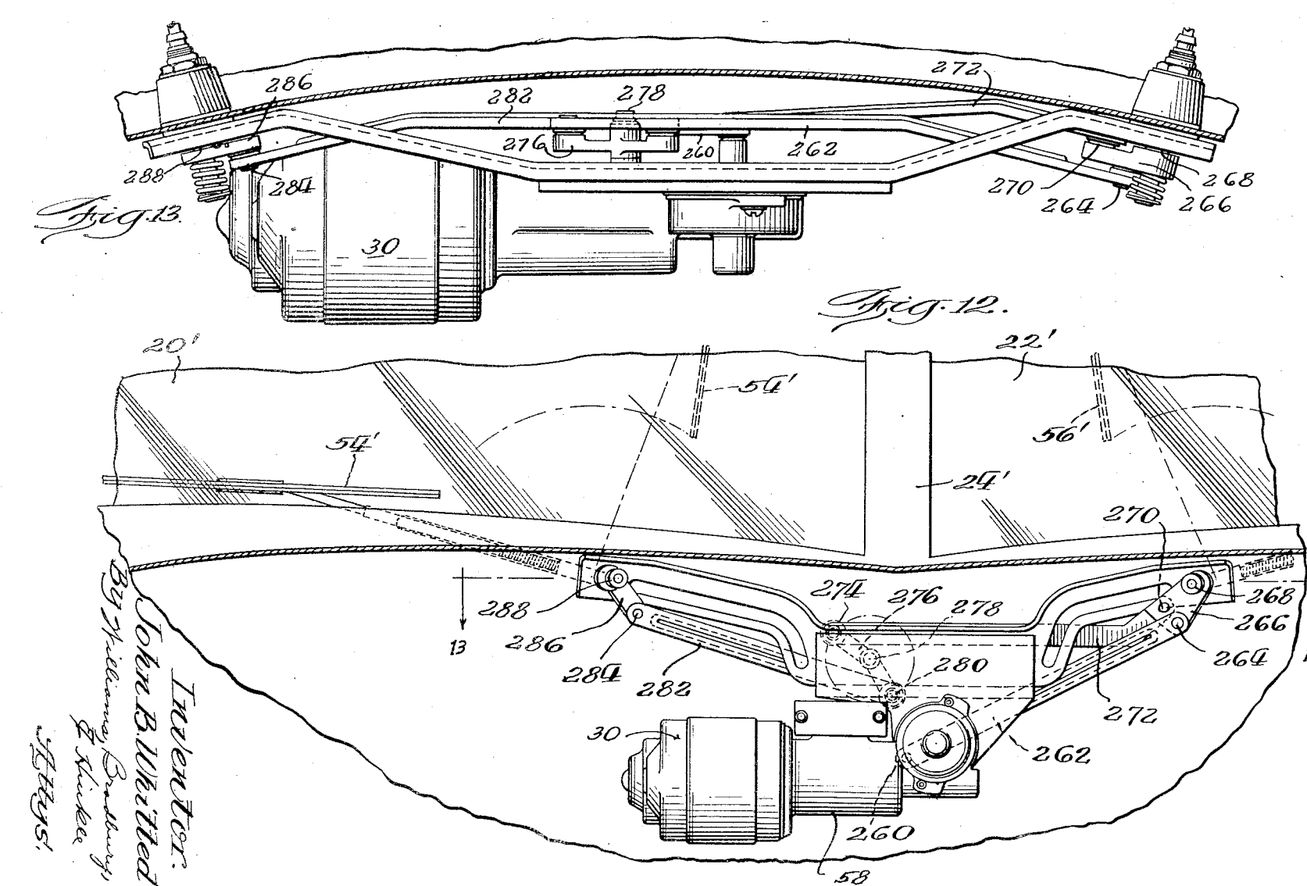
Fig. 12 shows a modification wherein a different arrangement for mounting the wind shield wiper relative to the wind shield is provided and wherein there is an alternative form of mechanism for driving the wiper blades.
Fig. 13 is a plan view of the modification shown in Fig. 12 and is taken on the line 13—13 of Fig. 12.

In Figures 12 and 13 I have illustrated a modified type of mounting for the wiper blades and a modified form of mechanism for driving these blades. In this modification the blades 54' and 56' are illustrated as having a parking position substantially horizontal and with the outer ends of the blades 54' and 56' closely approaching the outside edges of the glass panels 20' and 22' of the wind shield. In their other extreme positions, the blades are nearly vertical and closely adjacent the metal strip 24' centrally located between the panels 20' and 22'.

The wiper blade arrangement of Figure 12 has the advantage that the linkage connecting the wiper blade operating arms with the worm wheel is shorter and that the entire wind shield wiper assembly may be made lighter and more compact. In this embodiment of my invention the worm wheel 34 drives a crank pin 260 to reciprocate the link 262 connected to a pin 264 on an arm 266 of shaft 268 of wiper blade 56'. Arm 266 is provided with a second pin 270 connected to one end of a link 272 having its other end pivotally connected at 274 to one end of a walking beam 276 having a fixed pivot 278. The other end of the walking beam 276 is pivoted at 280 to a link 282 connected to pin 284 on arm 286 attached to shaft 288 of wiper blade 54'.

It will be understood that the mechanism for driving the crank pin 260 and the control mechanism therefor are the same as used in the first-described embodiment of my invention.

Figures 14, 15, 16:
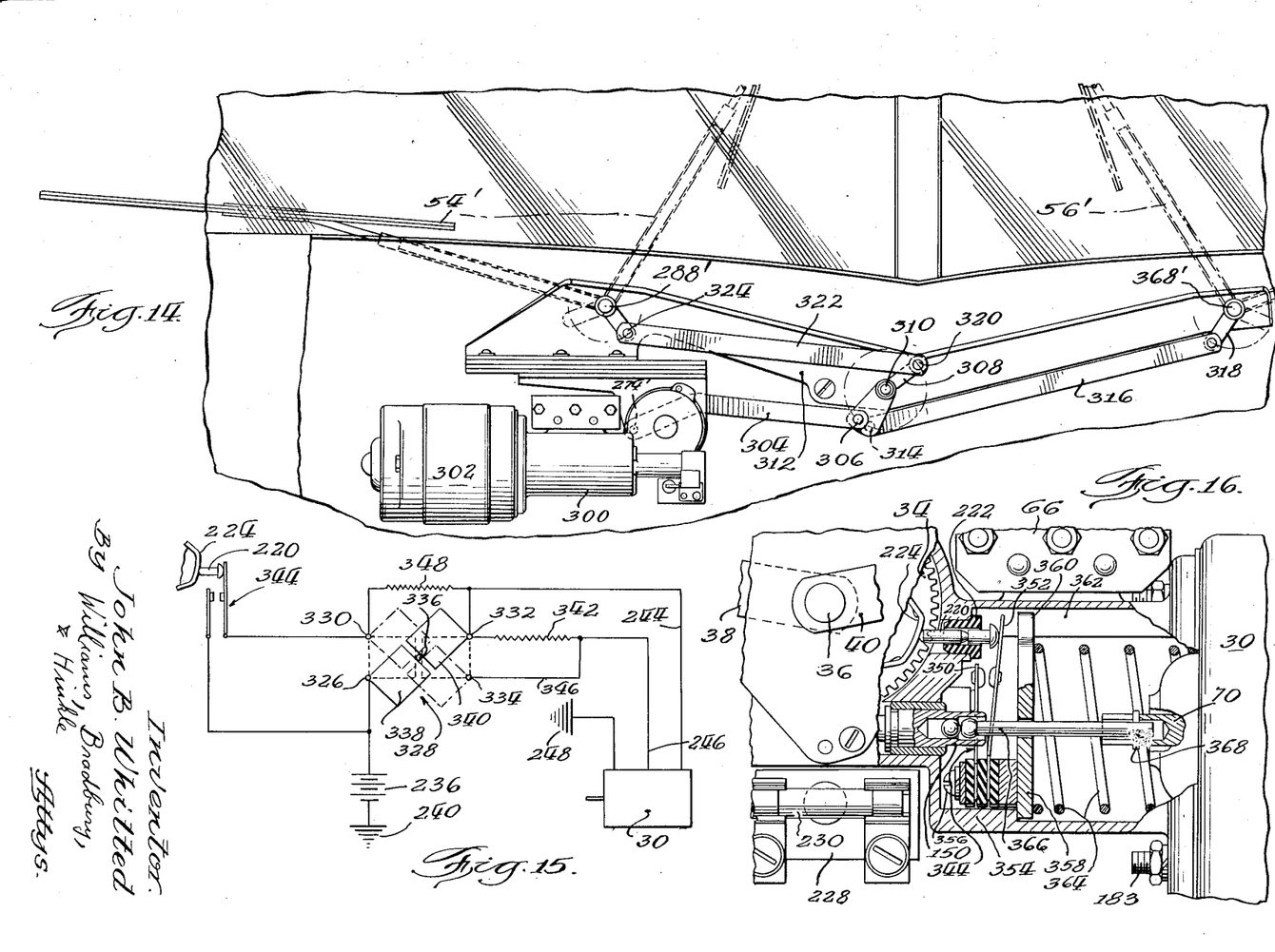
Fig. 14 is a view similar to Fig. 12 but showing a variation wherein the motor and drive housing are offset with respect to the center of the wind shield.
Fig. 15 is a wiring diagram of a simplified form of my invention.
Fig. 16 is a view illustrating the mechanical changes in the embodiment utilizing the wiring diagram of Fig. 15.

Figure 14 illustrates a variation of the embodiment shown in Figures 12 and 13. In Figure 14 the housing 300 and motor 302 are offset with respect to the center of the wind shield to permit installation of the automobile radio, or similar device, in the center of the instrument board. The linkage for connecting the crank pin 274' with the wiper blades 54' and 56' is modified only slightly.

In the embodiment of Figure 14, a dog-leg-shaped link 304 connects the crank pin 274' with a pin 306 on walking beam 308 pivoted at 310 on frame 312. Walking beam 308 has a pin 314 connected by link 316 to arm 318 on wiper blade shaft 368'. A third pin 320 on walking beam 308 is connected by link 322 to arm 324 on wiper blade shaft 288'.

In Figure 15 I have illustrated a wiring diagram of a modified form of my invention which is materially cheaper than that previously described in that the clutch and solenoid control therefor can be eliminated. In the embodiment of Figure 15, the automobile battery 236 has one side grounded, as indicated at 240, and the other side connected to a terminal 326 of a manually operated switch indicated generally by reference numeral 328. This switch has three other terminals, 330, 332, and 334 respectively, and a central shaft 336 adapted to be manually rotated and carrying a pair of contact plates 338 and 340 adapted to be brought into selected engagements with the several contacts. It is to be understood that the contact plates 338 and 340 are in electrical communication with each other and that two plates are used in lieu of one simply because two plates make it possible to establish effective contact with all four switch terminals simultaneously.

The motor 30, as in the previous embodiment, has an armature circuit 244, and a field circuit 246, both of which are grounded at 248. When the switch 328 is manually shifted to call for high-speed wind shield wiper operation, the contact plates 338 and 340 assume the full line position shown in Figure 15. In this position of the switch, the armature circuit 244 is connected to the battery through switch terminals 326 and 332 bridged by contact plates 338 and 340. The field circuit 246 is connected to the battery through the same two switch terminals but a resistance 342 is interposed between the terminal 332 and the field circuit 246.

As soon as the motor 30 starts to rotate, the cam 224 moves out of engagement with pin 220, permitting automatic switch 344 to close, but the opening and closing of automatic switch 344 does not affect the operation of the wind shield wiper as long as the contact plates 338 and 340 remain in the full line position shown in Figure 15.

When it is desired to operate the embodiment of Figure 15 at slow speed, the manual switch 328 is rotated to shift the contact plates 338 and 340 to the dotted line position shown in Figure 15. In this position the resistance 342 connected to the field circuit is ineffective because of the parallel circuit 346 connecting the field circuit 246 with terminal 334 which is in electrical communication with the battery by way of switch contacts 338 and 340 and live switch terminal 326. The connections to the armature circuit 244 remain unchanged so that the sole result of shifting the switch 328 from high-speed to low-speed position is to render ineffective the resistance 342 in the field circuit.

When the operator desires to stop the wiper, he shifts the manual switch 328 to the third position indicated by phantom lines in Figure 15. In this position the contact plates 338 and 340 serve solely as a means of electrical communication between switch terminals 330 and 334, thereby placing wire 346 and field circuit 246 in electrical communication with the automatic switch 344. The armature circuit 244 is likewise in electrical communication with the automatic switch 344 by way of resistance 348. Thus, all communication between the battery 236 and the field and armature circuits are through the automatic switch 344.

The first effect of shifting the manual switch 328 to this third position is to further decrease the speed of operation of the wind shield wiper because of the interposition of resistance 348 in the armature circuit of the motor. As soon as cam 224 engages pin 220, the automatic switch 344 is moved to open position, thereby breaking the circuits connecting the battery with the field and armature circuits of the motor 30. Because of the slow speed at which the wind shield wiper is operating when this occurs, the armature of the motor 30 has little momentum so that this armature, the wiper blades, and all driving connections come to rest quickly and before the cam 224 has passed beyond the pin 220.

While the modification shown in Figures 15 and 16 does not stop the wiper blades quite as quickly or accurately as do the previous embodiments, I have found that the embodiment of Figures 15 and 16 stops the wiper blades sufficiently quickly and accurately for commercial purposes and constitutes a highly desirable form of my invention where expense is a prime consideration.

By using the circuit arrangement of Figure 15, it is possible to eliminate several of the parts necessary in the previous embodiments. A comparison of Figure 16 with Figure 4 will quickly indicate the parts which can be eliminated. In Figure 16 there is illustrated the automatic switch 344 which need consist of only two switch plates 350 and 352 controlled by the pin 220 and cam 224 as in the previous embodiments. It will be understood that the switch plates 350 and 352 are preferably provided with spring fingers for engaging suitable terminals in the end of the housing 354 in the manner similar to that previously described. The switch plates 350 and 352 are mounted upon a screw 356 attached to a plate 358 having a tongue 360 engageable in a suitable groove 362 in the housing 354. The plate 358 may be held in place by a spring 364 interposed between the motor 30 and the plate 358. The motor 30 may be bolted or otherwise suitably secured to the right-hand end of the housing 354 as in the previous embodiment.

A simple shaft 366 is preferably used to connect the motor shaft 70 with the worm shaft 150. The connection between the shaft 366 and the worm shaft 150 may be the same as that previously described in connection with Figure 4. The other end of the shaft 366 may make any suitable connection with the motor shaft 70. This connection is preferably of such a nature as to compensate for variations in the length of the shafts and for this purpose I have illustrated a simple pin-and-slot connection 368. If desired, a similar pin-and-slot connection may be substituted for the more elaborate connection between the other end of the shaft 366 and the worm shaft 150, it being understood that sufficient play is to be provided to compensate for possible variations in alignment between the motor 30 and the worm shaft 150.

In the embodiment of Figure 4, the solenoid 126, automatic switch mechanism 173, shaft 98, and the clutch mechanism therefor are preferably assembled as a unit prior to insertion in the tubular housing 58. Thereafter the spring 182 is inserted and then the motor 30 is bolted to the end of the housing. In the embodiment of Figure 16, the plate 358, automatic switch 344, and shaft 366 may be similarly assembled prior to insertion in the housing 354.

In Figure 15 I have illustrated a particular type of manual switch because this type of manual switch is suitable for the purpose and is compact and inexpensive. It is to be understood, however, that other types of switches may be used and that this embodiment of my invention will operate satisfactorily with any suitable type of switch.

It is to be understood that my invention may assume numerous forms and that it is not limited to the details illustrated and described herein.

I claim:

1. An electric wind shield wiper for a vehicle having a battery, said wiper comprising wiper blades, an electric motor for driving said blades, driving mechanism interposed between said motor and blades, said driving mechanism including an electrically controlled clutch for connecting and disconnecting said motor from said wiper blades, switch means manually movable to a position connecting said motor and clutch control means to said battery and movable to a second position disconnecting said motor and clutch control means from said battery and from each other, parallel circuits connecting said motor and clutch control means with said battery independently of said manual switch, automatic switch means in said manual circuit, and cam means connected with said driving mechanism on the wiper blade side of said clutch and movable in predetermined and definite relationship to said wiper blades, said cam being positioned to engage said automatic switch mechanism and break said parallel circuits and stop said wiper blades in predetermined positions.

2. In an electric wind shield wiper of the class described, the combination of wiper blades, a motor for operating said blades, a clutch interposed between said motor and blades, electrical control means for said clutch, common circuit means for connecting said motor and control means with a source of electricity, and switch means for disconnecting said motor and clutch control means from said source and from each other.

3. In an electric wind shield wiper of the class described, the combination of wiper blades, a motor for operating said blades, a clutch interposed between said motor and blades, electrical control means for said clutch, common circuit means for connecting said motor and control means with a source of electricity, and switch means for disconnecting said motor and clutch control means from said source.

4. An electric wind shield wiper for a vehicle having a battery, said wiper comprising wiper blades, an electric motor for driving said blades, driving mechanism interposed between said motor and blades, said driving mechanism including an electrically controlled clutch for connecting and disconnecting said motor from said wiper blades, switch means manually movable to a position connecting said motor and clutch control means to said battery and movable to a second position disconnecting said motor and clutch control means from said battery, parallel circuit means connecting said motor and clutch control means with said battery independently of said manual switch, automatic switch means in said manual circuit, and cam means connected with said driving mechanism on the wiper blade side of said clutch and movable in predetermined and definite relationship to said wiper blades, said cam being positioned to engage said automatic switch mechanism to break said parallel circuit means and stop said wiper blades in predetermined positions.

5. In an electric wind shield wiper the combination of a housing having electrical terminals therein and a shaft journaled in said housing, a sub-assembly comprising a solenoid, switch mechanism, driving mechanism for said shaft including a clutch controlled by said solenoid and switch mechanism carried by said solenoid, said switch mechanism adapted to make contact with said terminals and said driving mechanism adapted to engage said shaft in driving relationship, said sub-assembly adapted to be inserted as a unit into said housing and having means cooperating with said housing accurately to position said sub-assembly in said housing, and motor means attachable to said housing to rotate said driving mechanism and to hold said sub-assembly in said housing, and wiper mechanism driven from said shaft.

6. A unitary electric wind shield wiper assembly comprising a frame adapted for attachment to a vehicle, a housing mounted on said frame, vibration-dampening means interposed between said housing and said frame, a motor attached to said housing, a pair of wiper arm shafts mounted in the extremities of said frame, an arm on each shaft, a link connected to each arm, a crank shaft rotatably mounted in said housing, cranks on said shaft for driving said links, and mechanism in said housing connecting said motor and crank shaft, said mechanism including an electrically controlled clutch, means interposed between said clutch and said motor for compensating for variations in motor shaft length, and automatic switch means for actuating said electrically controlled clutch.

7. In an electric wind shield wiper the combination of a housing having electrical terminals therein, a sub-assembly comprising a solenoid and switch mechanism for controlling the same, said switch mechanism mounted on said solenoid, said switch mechanism adapted to make contact with said terminals to form electric circuits therewith, said sub-assembly adapted to be inserted as a unit into said housing and having means cooperating with said housing accurately to position said sub-assembly in said housing, and motor means attachable to said housing to rotate said driving mechanism and to hold said sub-assembly in said housing, and wiper mechanism driven from said motor under the control of said switch mechanism.

8. A unitary electric wind shield wiper assembly comprising a frame adapted for attachment to a vehicle, a housing mounted on said frame, a motor attached to said housing, a pair of wiper arm shafts mounted in the extremities of said frame, an arm on each shaft, a link connected to each arm, a crank shaft rotatably mounted in said housing, cranks on said shaft for driving said links, and mechanism in said housing connecting said motor and crank shaft, said mechanism including an electrically controlled clutch, and automatic switch means for actuating said electrically controlled clutch.

9. In an electric wind shield wiper of the class described, the combination of a motor, wiper mechanism driven from said motor, a clutch interposed between said motor and said wiper mechanism, electrical means for controlling said clutch, and switch mechanism for operating said control means and motor, said switch mechanism including a pair of plates each having a spring finger adapted to be brought into engagement and resiliently held against an electrical terminal, and a second contact remote from said spring finger, a third plate biased toward said first-named plates and adapted to engage the last-named contacts thereof, means insulating said plates from each other, and movable means operating said last-named plate to make and break contacts between said plate and said other plates.

10. In a device of the class described, the combination of a housing having a recess therein and electrical terminals and a movable member extending into said recess, electrical clutch control means insertable in said recess as a unit including switch mechanism comprising spring fingers engageable with said terminals and resilient contact means controllable by said movable member, and means for retaining said clutch control mechanism in said housing.

11. Clutch control means for connecting and disconnecting shafts of variable length comprising a clutch member mounted on one of said shafts and having a splined relation therewith, a spring for urging said clutch member toward the complementary shaft, a recess in said clutch member for receiving one end of said complementary shaft, a ball accurately positioned in said clutch member for limiting the telescoping action of said clutch member and complementary shaft under the influence of said spring, and a second clutch member mounted on said complementary shaft.

12. Driving mechanism comprising a first shaft having a recess in one end thereof and an axial slot in said end, a washer having a tongue engaging said slot and abutting the inner end thereof, a clutch member having a tongue engaging said slot, spring means interposed between said clutch member and said washer, a complementary shaft, anti-friction means accurately positioned in said clutch member and engageable with the end of said complementary shaft under the force exerted by said spring whereby said clutch member is accurately positioned longitudinally of said complementary shaft, and a complementary clutch member carried by said complementary shaft.

13. In a device of the class described, clutch control means for connecting and disconnecting shafts of variable length, comprising a clutch member mounted on one of said shafts and having a splined relation therewith, a spring for urging said clutch member toward the complementary shaft, a recess in such clutch member for receiving one end of said complementary shaft, anti-friction means accurately positioned to limit the telescoping action of said clutch member and said complementary shaft under the influence of said spring, and a second clutch member mounted on said complementary shaft.

14. In an electric wind shield wiper of the class described, the combination of a wiper blade, a motor for driving said blade, a circuit arrangement for operating said motor at high speed, a second circuit arrangement for operating said motor at a lower speed, a third circuit arrangement for operating said motor at a still lower speed, a manual switch controlling said motor and permitting selection of any desired circuit arrangement for operating said motor, and automatic parking means in said last-named circuit arrangement for stopping said wiper blade in retracted position.

15. In a device of the class described, the combination of an operating member, an electrical motor for driving said member, a first circuit for operating said motor at a given speed, a parking circuit for reducing the speed of said motor below said given speed, a switch for selectively connecting said motor with either of said circuits for operation thereby, and automatic means in said parking circuit for stopping said member in predetermined position.

16. In a device of the class described, the combination of an operating member, a motor for driving said member, a three-way switch for controlling said motor, a high-speed circuit connecting said motor and switch, a low-speed circuit connecting said motor and switch, and a parking circuit connecting said motor and switch, said parking circuit including means for reducing the speed of said motor below said low speed, and automatic means for stopping said operating member in predetermined position.

17. In a device of the class described, the combination of a motor, circuits for operating said motor at different speeds, a switch controlling said circuits, said switch having a plurality of terminals, a pair of oppositely disposed resilient contact plates for engaging said terminals, means for shifting said contact plates relative to said terminals, an operating member driven by said motor, and automatic means for stopping said motor and driven member when the latter is in predetermined position.

JOHN B. WHITTED.